US009898315B1

(12) United States Patent
Li et al.

(10) Patent No.: US 9,898,315 B1
(45) Date of Patent: Feb. 20, 2018

(54) MANAGEMENT OF DEMAND FOR VIRTUAL COMPUTING RESOURCES

(71) Applicant: Amazon Technologies, Inc., Seattle, WA (US)

(72) Inventors: Xiao Yu Li, Seattle, WA (US); Charles Ian Ormsby Cary, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 182 days.

(21) Appl. No.: 14/551,823

(22) Filed: Nov. 24, 2014

(51) Int. Cl.
*G06F 9/455* (2006.01)

(52) U.S. Cl.
CPC .................. *G06F 9/45533* (2013.01)

(58) Field of Classification Search
CPC ...... G06F 9/445; G06F 9/45533; G06F 9/455; G06F 9/5077
See application file for complete search history.

(56) References Cited

U.S. PATENT DOCUMENTS

| 7,640,547 | B2 * | 12/2009 | Neiman | G06F 9/5044 705/5 |
| 8,612,987 | B2 * | 12/2013 | Naik | G06F 9/505 718/104 |
| 8,826,277 | B2 * | 9/2014 | Chang | G06F 9/45545 707/602 |
| 8,843,924 | B2 * | 9/2014 | Dow | G06F 9/45504 718/1 |
| 8,990,639 | B1 | 3/2015 | Marr et al. | |
| 2009/0328052 | A1 * | 12/2009 | Nguyen | G06Q 20/32 718/104 |
| 2011/0252134 | A1 | 10/2011 | Villeneuve et al. | |
| 2012/0311574 | A1 * | 12/2012 | Song | G06F 11/3003 718/1 |
| 2013/0055258 | A1 * | 2/2013 | De | G06F 9/45533 718/1 |
| 2013/0067023 | A1 * | 3/2013 | Joy | H04L 63/1458 709/217 |
| 2013/0311539 | A1 * | 11/2013 | Ngai | G06F 9/5072 709/201 |

* cited by examiner

*Primary Examiner* — Marina Lee
(74) *Attorney, Agent, or Firm* — Knobbe, Martens, Olson & Bear, LLP

(57) ABSTRACT

Systems and methods for managing demand for virtual computing resources are disclosed. A demand forecasting service can obtain and analyze historical demand data for purposes of predicting future demand. The analysis includes identifying untargeted demand corresponding to requests for virtual machine instances that can be fulfilled by any availability zone of a set of zones. The demand forecasting service may provide predictions of future demand including information regarding future untargeted demand, thereby enabling efficient allocation of computing resources among various availability zones to meet the future demand.

22 Claims, 6 Drawing Sheets

MANAGEMENT OF DEMAND FOR VIRTUAL COMPUTING RESOURCES

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf, or for the benefit of, the general public.

To facilitate increased utilization of data center resources, virtualization technologies may allow a physical computing node, such as a single physical computing device, to host one or more instances of virtual machines that appear and operate as independent computing devices to users of a data center. With the introduction of virtualization technology, a computing service provider can now provide computing resources or services to customers dynamically or in a scalable manner. For example, a single physical computing node can create, maintain, delete, or otherwise manage virtual machines in a dynamic manner. The physical computing nodes can be interconnected by communication networks and grouped into availability zones, such as a data center. Further, the computing service provider can operate multiple availability zones in a geographical region.

In some scenarios, virtual machine instances may be configured according to a number of virtual machine instance types to provide specific functionality. For example, various computing devices may be associated with different combinations of operating systems or operating system configurations, virtualized hardware resources and software applications to enable a computing device to provide different desired functionalities, or to provide similar functionalities more efficiently. These virtual machine instance type configurations are often contained within a device image, which includes static data containing the software (e.g., the OS and applications together with their configuration and data files, etc.) that the virtual machine will run once started. The device image is typically stored on the disk used to create or initialize the instance. Thus, a computing device may process the device image in order to implement the desired software configuration.

As user demands for virtual machine instances increase, the computing service provider can adjust or allocate physical computing resources, such as building additional server rooms, adding more racks of servers, or re-provisioning existing computing nodes, across various availability zones to meet the demand. The computing service provider is generally interested in efficiently adjusting or allocating the physical computing resources to adequately cope with user demands.

BRIEF DESCRIPTION OF THE DRAWINGS

The foregoing aspects and many of the attendant advantages will become more readily appreciated as the same become better understood by reference to the following detailed description, when taken in conjunction with the accompanying drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
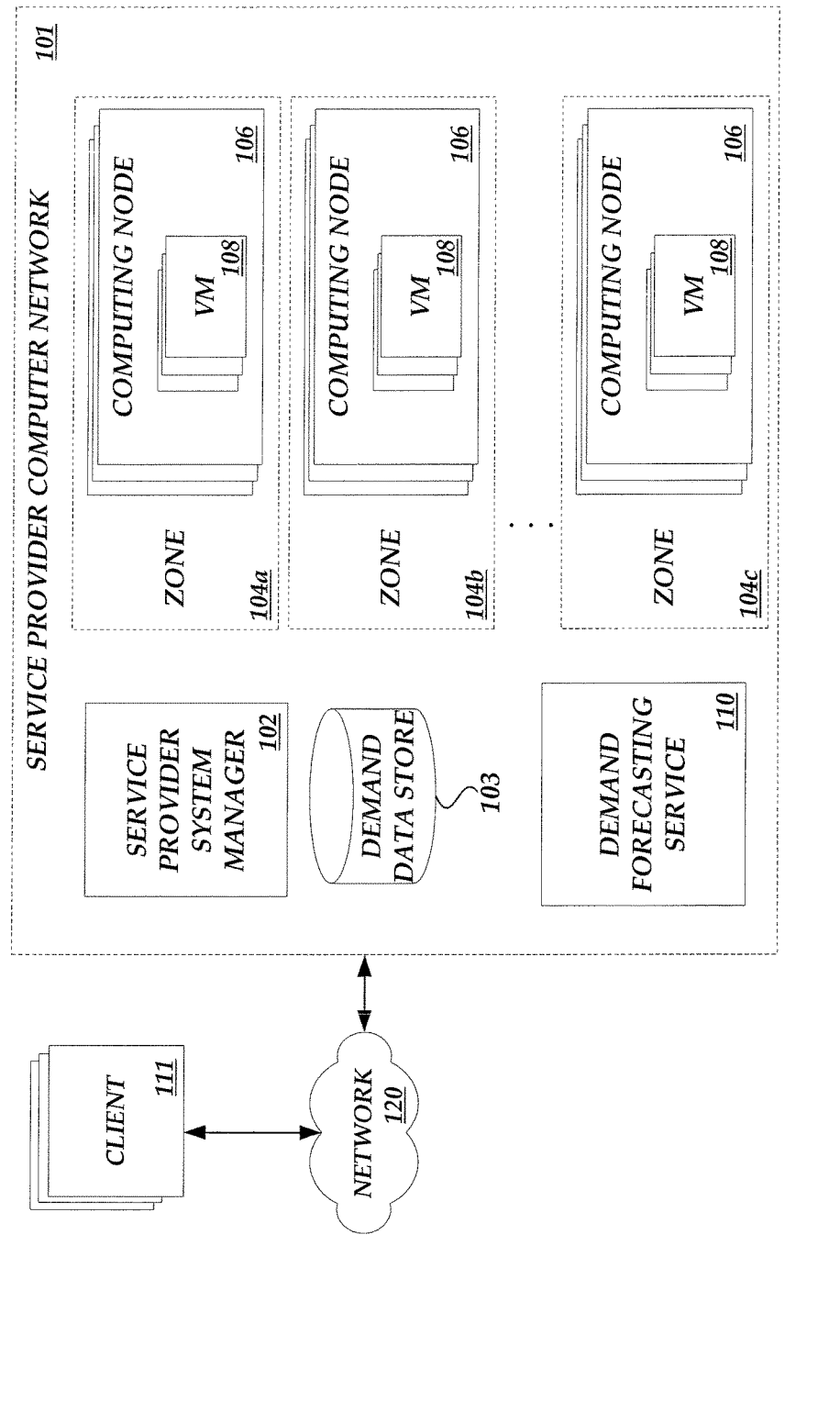
FIG. 1 is a block diagram illustrating one embodiment of an operating environment including a demand forecasting service for predicting future demand for virtual machine instances.

Companies and organizations no longer need to acquire and manage their own data centers in order to perform computing operations (e.g., execute code, including threads, programs, software, routines, subroutines, processes, etc.). With the advent of network-based computing, storage space and compute power traditionally provided by hardware computing devices can now be obtained and configured in minutes through a computing service provider over the Internet. Thus, developers can quickly request a desired amount of computing resources without having to worry about acquiring physical machines. Such computing resources are typically acquired in the form of virtual computing resources, or virtual machine instances. These instances of virtual machines, which are hosted on physical computing nodes, such as computing devices with their own operating systems and other software components, can be utilized in the same manner as physical computers.

A computing service provider, on the other hand, needs to acquire and manage physical computing resources in order to meet user demand for virtual computing resources. Computing nodes hosting virtual machine instances can be interconnected via communication networks and grouped into different availability zones ("zones"), such as data centers located in different cities. Data communications within a zone are typically associated with lower latencies than among the zones. The computing service provider may facilitate multiple zones within a geographic region where users may acquire virtual computing resources. To meet user demand for virtual computing resources (e.g., fulfilling user requests for instantiating virtual machine instances within a geographic region), illustratively, the computing service provider distributes the user requests among the zones as directed by the user requests or based on a zone's free capacity to instantiate the type of virtual machines as requested by the users. Accordingly, the computing service provider wishes to forecast future user demand and allocate physical computing resources efficiently among various zones so that ideally the cost for the allocation of resources is minimized and future user demand can be adequately serviced.

Generally described, aspects of the present disclosure relate to the management of demand for virtual computing resources. The demand for virtual computing resources may include targeted demand and untargeted demand. Generally speaking, targeted demand aims at a specific zone and virtual machine instance requests corresponding to the targeted demand must be fulfilled by the specific zone. For example, a user may request a virtual machine instance to be launched by a specific data center located in city A. As will be appreciated by one skilled in the relevant art, forecasting future targeted demand may provide a baseline for the computing service provider to allocate adequate computing resources to specific zones which must fulfill requests corresponding to the future targeted demand.

Untargeted demand is not tied to a specific zone and usually can be handled by any zone of a geographic region. For example, a user may request a virtual machine instance to be launched from the region of U.S. West Coast but does not specify a zone within the region. As another example, a user may simply request a virtual machine instance without any restriction or requirement on zones, and the computing service provider may determine a geographic region that best serve the user's needs based on location information associated with the user. Accordingly, the computing service provider has more flexibility in fulfilling requests corresponding to untargeted demand than targeted demand. Forecasting future untargeted demand may improve the efficiency of resource allocation dramatically (e.g., by directing future untargeted demand to zones where resources are already available or are scheduled to be allocated, or by deploying additional resources for handling the untargeted demand to one or more zones that incur a smallest cost). Forecasting untargeted demand is especially useful if the untargeted demand accounts for a considerable portion of the total demand or if the untargeted demand causes spikes in total demand. Specifically, the present disclosure discloses systems and methods which facilitate management of the demand for virtual machine instances by predicting attributes of untargeted demand based on historical demand data.

In accordance with an example embodiment, a demand forecasting service may obtain historical demand data for virtual computing resources from a service provider. For example, the demand forecasting service may access a demand data store of the service provider, which maintains logs of requests for virtual machine instances as well as information regarding fulfillment of the requests. The user requests may identify the type of the requested virtual machine instances, which may vary based on combinations of processing, memory, storage, and networking capacity. The user requests may also specify whether the requests are targeted or untargeted (e.g., whether the request specifies a particular zone to launch the virtual machine instance). The fulfillment information may indicate how user requests are dispatched and fulfilled among different zones.

The demand forecasting service may analyze the historical data and build a forecasting model to predict future demand for virtual computing resources. In particular, the demand forecasting service may distinguish targeted demand from untargeted demand with respect to each type of virtual machine instances that are requested. Illustratively, the demand forecasting service may perform time series analysis over untargeted demand alone or in combination with targeted demand and predict a future demand that includes at least an attribute of untargeted demand for a future time, such as a percentage of untargeted demand within a total magnitude of the future demand. The forecasting model building can be performed for each zone, a set of zones (e.g., zones that belong to a geographic region), each type of virtual machine instance, a set of instance types, or their combination. The demand forecasting service may then transmit the predicted demand to the service provider, thereby enabling the service provider to strategically allocate physical computing resources among different zones to efficiently meet future demand for virtual computing resources.

Specific embodiments and example applications of the present disclosure will now be described with reference to the drawings. These embodiments and example applications are intended to illustrate, and not limit, the present disclosure.

FIG. 1 is a block diagram illustrating one embodiment of an operating environment 100 including a demand forecasting service 110 for predicting future demand for virtual machine instances. The example shown in FIG. 1 includes the operating environment 100 in which users (e.g., developers, etc.) of client computing devices ("clients") 111 may request virtual computing resources, such as virtual machine instances, via a service provider computer network 101.

By way of illustration, various example clients 111 are shown in communication with the service provider computer network 101. In general, the clients 111 can be any computing device such as a desktop, laptop, mobile phone (or smartphone), tablet, kiosk, wireless device, and other electronic devices. Also, the clients 111 may include Internet of Things (IoT) devices such as Internet appliances and connected devices. The service provider computer network 101 may provide the clients 111 with one or more user interfaces, command-line interfaces (CLI), application programming interfaces (API), and/or other programmatic interfaces for requesting, configuring, and utilizing virtual machine instances; generating and uploading user codes, invoking the user codes, etc.

The clients 111 access the service provider computer network 101 over a network 120. The network 120 may be any wired network, wireless network, or combination thereof. In addition, the network 120 may be a personal area network, local area network, wide area network, over-the-air broadcast network (e.g., for radio or television), cable network, satellite network, cellular telephone network, or combination thereof. For example, the network 120 may be a publicly accessible network of linked networks, possibly operated by various distinct parties, such as the Internet. In some embodiments, the network 120 may be a private or semi-private network, such as a corporate or university intranet. The network 120 may include one or more wireless networks, such as a Global System for Mobile Communications (GSM) network, a Code Division Multiple Access (CDMA) network, a Long Term Evolution (LTE) network, or any other type of wireless network. The network 120 can use protocols and components for communicating via the Internet or any of the other aforementioned types of networks. For example, the protocols used by the network 120 may include Hypertext Transfer Protocol (HTTP), HTTP Secure (HTTPS), Message Queue Telemetry Transport (MQTT), Constrained Application Protocol (CoAP), and the like.

The operating environment 100 illustrated FIG. 1 includes the service provider computer network 101, which includes a service provider system manager 102, a demand data store 103, and computing nodes 106 grouped into zones 104. As described above, the one or more computing nodes 106 (e.g., servers) may be geographically dispersed or geographically co-located, for instance, in one or more data centers. In some embodiments, a zone 104 may correspond to a single data center, a set of data centers, a division of a data center, or a logical grouping of divisions of multiple data centers. In the depicted example, virtual machine instances ("instances") 108 are shown as hosted on their respective computing nodes 106.

The illustration of the various components within the service provider computer network 101 is logical in nature and one or more of the components can be implemented by a single computing device or multiple computing devices. For example, the service provider system manager 102 or the demand data store 103 can be implemented across multiple physical computing devices. Alternatively, the service provider system manager 102 or the demand data store 103 can be implemented on a single physical computing device. In some embodiments, the service provider computer network 101 may comprise a greater or fewer number of components. For example, the service provider computer network 101 may include multiple service provider system managers or demand data stores.

In the example of FIG. 1, the service provider computer network 101 is illustrated as being connected to the network 120. In some embodiments, any of the components within the service provider computer network 101 can communicate with other components (e.g., client 111 and the demand forecasting service 110). In other embodiments, not all components of the service provider computer network 101 are capable of communicating with other components of the operating environment 100. In one example, only the service provider system manager 102 may be connected to the network 120, and other components of the service provider computer network 101 may communicate with other components of the operating environment 100 via the service provider system manager 102.

Users may use the clients 111 to communicate with the service provider computer network 101. For example, a user may wish to run a piece of code in connection with a web or mobile application that the user has developed. One way of running the code would be to request virtual machine instances from the service provider and use the virtual machine instances to run the code. Alternatively, the user may send a code execution request to the service provider computer network 101. The service provider computer network 101 can automatically request and acquire virtual machine instances to execute the code on behalf of the user. In the example illustrated in FIG. 1, the service provider system manager 102 processes all the requests for virtual machine instances, whether user generated or system generated. Illustratively, the service provider system manager 102 dispatches the requests to one or more zones in accordance with a free capacity associated with the one or more zones that may fulfill the requests. The service provider system manager 102 may also store data regarding the requests and their fulfillment in the demand data store 103, for example, in a form of system logs. A person skilled in the relevant art will appreciate that requests for virtual machine instances can be processed by multiple components and/or subcomponents of the service provider computer network 101 and the data regarding the requests and their fulfillment can be stored in multiple locations.

The demand data store 103 can generally include any repository, database, or information storage system. Alternatively, or in addition, a demand data store 103 can be a data service or interface, which obtains or provides data upon request. The demand data store 103 can store any data relevant to historical demand for virtual machine instances. For example, the historical data may include logs of requests submitted by users or generated by the service provider computer network 101 and information regarding dispatch and fulfillment of the requests by different zones.

As illustrated in FIG. 1, also included within the service provider computer network 101 is the demand forecasting service 110. In some embodiments, the demand forecasting service 110 can be implemented as a standalone service capable of communicating with the service provider computer network 101, for example, via the network 120. The demand forecasting service 110 may be implemented by one or more computing devices. For example, the demand forecasting service 110 may be implemented by computing devices that include one or more processors to execute one or more instructions, memory, and communication devices to transmit and receive data over the network 120. In some embodiments, the demand forecasting service 110 is implemented on one or more backend servers capable of communicating over a network. In other embodiments, the demand forecasting service 110 is implemented by one or more virtual machines in a hosted computing environment, such as via the service provider computer network 101.

In one aspect, the demand forecasting service 110 can implement one or more applications that perform, individually or in combination, the demand forecasting functions described herein, including analysis of historical demand data, identifying untargeted and targeted demand, building and updating forecasting models, predicting future demand including attributes of untargeted demand, as well as other functionalities disclosed herein. In another aspect, the demand forecasting service 110 may be configured to communicate with the service provider computer network 101 or its components, such as the service provider system manager 102 or the demand data store 103.

One skilled in the relevant art will appreciate that the components and configurations provided in FIG. 1 are illustrative in nature. Accordingly, additional or alternative components and/or configurations, especially regarding the additional components, systems, and subsystems for facilitating functions disclosed herein may be utilized.

Figure 2:
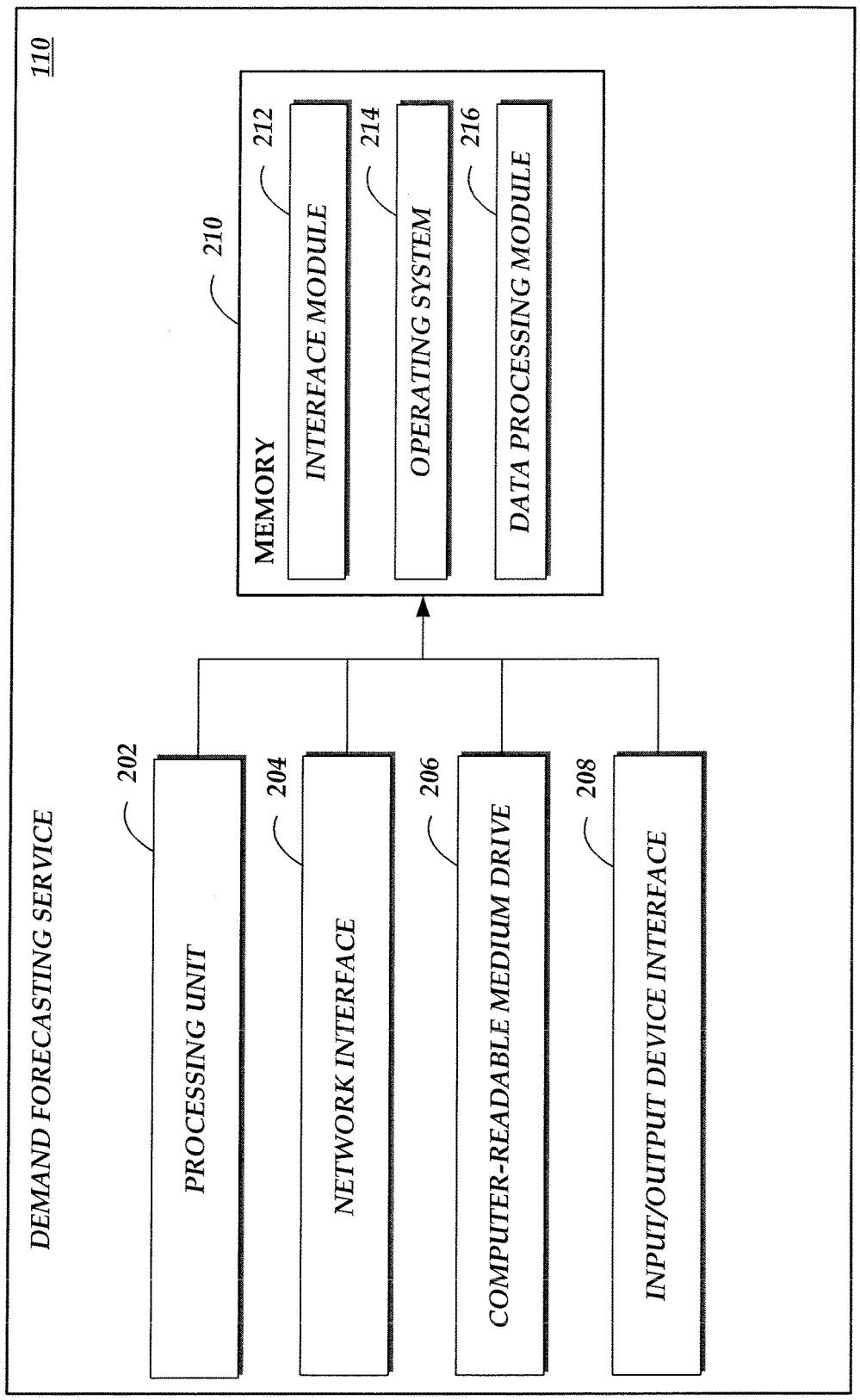
FIG. 2 is a block diagram illustrating an embodiment of example components of a computing system that implements the demand forecasting service utilized in accordance with the operating environment of FIG. 1.

FIG. 2 is a block diagram illustrating an embodiment of example components of a computing system that implements the demand forecasting service 110 utilized in accordance with the operating environment 100 of FIG. 1. The demand forecasting service 110 includes an arrangement of computer hardware and software components that may be used to implement aspects of the present disclosure. Those skilled in the relevant art will appreciate that the demand forecasting service 110 may include more (or fewer) components than those depicted in FIG. 2. It is not necessary, however, that all of these generally conventional components be shown in order to provide an enabling disclosure.

In the illustrated embodiment, the demand forecasting service 110 includes a processing unit 202, a network interface 204, a non-transitory computer-readable medium drive 206, and an input/output device interface 208, all of which may communicate with one another by way of a communication bus. The network interface 204 may provide demand forecasting service 110 with connectivity to one or more networks or computing systems. The processing unit 202 may thus receive information and instructions from other computing devices, systems, or services via a network. The processing unit 202 may also communicate to and from memory 210 and further provide output information via the input/output device interface 208. The input/output device interface 208 may also accept input from various input devices, such as a keyboard, mouse, digital pen, touch screen, etc.

The memory 210 may contain computer program instructions that the processing unit 202 may execute in order to implement one or more embodiments of the present disclosure. The memory 210 generally includes RAM, ROM and/or other persistent or non-transitory computer-readable storage media. The memory 210 may store an operating system 214 that provides computer program instructions for use by the processing unit 202 in the general administration and operation of the image processing service 102. The memory 210 may further include other information for implementing aspects of the present disclosure.

In one embodiment, the memory 210 includes an interface module 212. The interface module 212 can be configured to facilitate generating one or more user interfaces through which a component of the service provider computer network 101, a client 111 or other computing devices may send to, or receive from, the demand forecasting service 110 data regarding demand for virtual computing resources, data regarding demand dispatch and fulfillment of corresponding requests, predicted or estimated information regarding future demand, etc., or otherwise communicate with the demand forecasting service 110. Illustratively, the user interface can be implemented as a graphical user interface (GUI), network-based user interface, computer program, smartphone or tablet program or application, touchscreen, wearable computing device interface, command line interface, gesture, voice, or text interface, etc., or any combination thereof. In addition, the memory 210 may include a data processing module 216 that may be executed by the processing unit 202. In an example embodiment, the data processing module 216 implements aspects of the present disclosure. For example, the data processing module 216 can be configured to process historical data regarding demand for virtual computing resources, distinguish targeted from untargeted demand, build and update forecast models, generate demand forecast, predict future untargeted demand, etc.

It should be noted that the demand forecasting service 110 may be implemented by some or all of the components present in FIG. 2. In addition, the demand forecasting service 110 may include additional components not present in FIG. 2. The modules or components described above may also include additional modules or be implemented by computing devices that may not be depicted in FIG. 1 or 2. For example, although the interface module 212 and the data processing module 216 are identified in FIG. 2 as single modules, one skilled in the relevant art will appreciate that the modules may be implemented by two or more modules and in a distributed manner. As another example, the demand forecasting service 110 and its components can be implemented by network servers, application servers, database servers, combinations of the same, or the like, configured to facilitate data transmission to and from components of the service provider computer network 101, clients 111, or other computing devices or components, via network 120. Accordingly, the depictions of the modules are illustrative in nature.

Figure 3A:
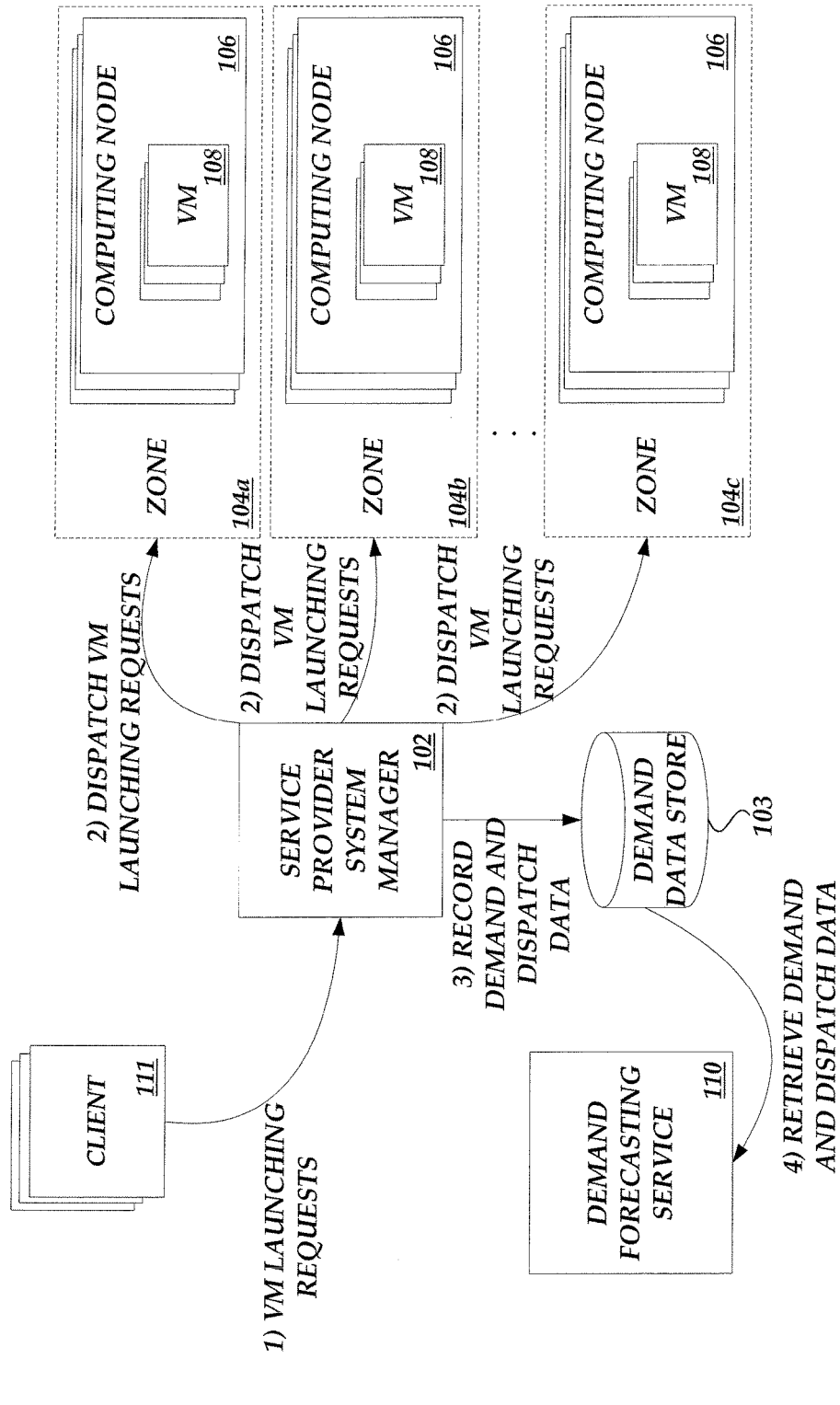
FIGS. 3A and 3B are simplified block diagrams illustrating interactions among components of the operating environment of FIG. 1 for analyzing historical demand data and generating demand forecast.
Figure 3B:
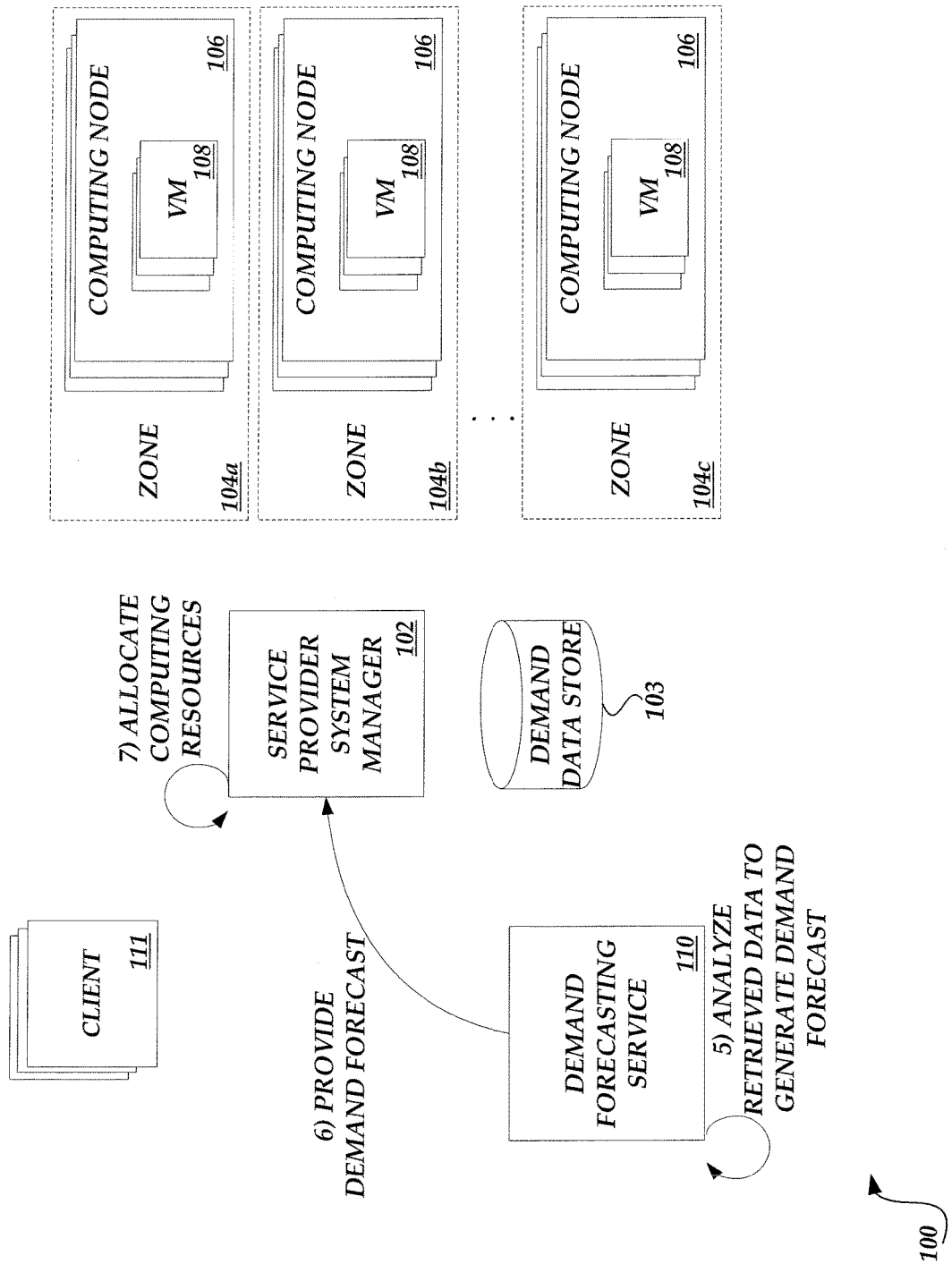

FIGS. 3A and 3B are simplified block diagrams illustrating interactions among components of the operating environment 100 of FIG. 1 for analyzing historical demand data and generating demand forecast. With reference to FIG. 3A, at (1), clients 111 transmits requests to instantiate virtual machine instances to the service provider system manager 102. As described above, in some embodiments, the requests to instantiate virtual machine instances may be generated by a component of the service provider computer network 101. The request may specify various requirements for the requested virtual machine instance, such as a type of the requested virtual machine instance, whether the request is targeted at a specific zone, a time to launch or terminate the virtual machine instance, etc. Illustratively, the requests may be in a form of application programming interface (API) calls which contain parameters that specify the requirements.

At (2), the service provider system manager 102 dispatches the requests for virtual machine instances to various zones for fulfillment of the requests. The dispatch can be based on requirements specified by the requests. For example, if the request specifies that the virtual machine instance must be launched by a specific zone, then the request is dispatched to the specific zone for fulfillment. If the request specifies a set of zones (e.g., but specifying a geographic region) to launch the virtual machine instance, the request may be dispatched to any zone within the set to be fulfilled. As another example, if the request specifies a particular type of virtual machine instance, the request may be dispatched to a zone which includes computing nodes capable of instantiating the particular type of instance.

The dispatch of untargeted requests can also be based on a free capacity associated with one or more zones for instantiating virtual machine instances. The free capacity of a zone may include an overall capacity to instantiate any instances or one or more specific capacity to instantiate one or more specific types of instances. The free capacity of a zone decreases when virtual machine instances are instantiated within the zone. The free capacity of a zone increases when more physical computing resources are allocated to the zone, such as building additional server rooms, adding more racks of servers, or provisioning existing computing nodes to support certain types of instances. The free capacity of a zone may also increase when instances are terminated from the zone. In one embodiment, individual untargeted requests are dispatched to a zone with a largest overall or specific free capacity corresponding to the type of instance requested. In other embodiments, the free capacities of different zones are associated with predetermined weights and the dispatch of untargeted requests are prioritized based on the weighted free capacities of the zones. In still other embodiments, the dispatch of untargeted requests to different zones are probabilistic so that the probability that a request is dispatched to a zone is proportional to the weighted or non-weighted free capacity of the zone.

At (3), the service provider system manager 102 records the demand and dispatch data at the demand data store 103. The service provider system manager 102 may perform the data recording periodically, upon receipt of a request, upon dispatch of a request, or based on other conditions that can be envisioned by a person of skill in the relevant art. The service provider system manager 102 may store the requests for virtual machine instances and record the dispatches of the requests at the demand data store 103, for example, in a form of system logs with time stamps. The service provider system manager 102 may also store the data in an aggregated form. For example, the demand and dispatch data may be aggregated to hourly or daily data, which may include breakdowns of zones, type of instances, targeted or untargeted demand, etc.

At (4), the demand forecasting service 110 retrieves demand and dispatch data from the demand data store 103. In some embodiments, the demand forecasting service 110 retrieves raw log files, which include timed information regarding requests and dispatches that accumulated over a predetermined period of time, from the demand data store 103. In other embodiments, the demand forecasting service 110 may be able to query the demand data store 103 based on attributes associated with the requests or dispatches, such as zones, instance types, targeted or untargeted requests, duration of time, combination of the same, or the like.

With reference to FIG. 3B, at (5), the demand forecasting service analyzes the retrieved data to generate demand forecast. In one embodiment, the demand forecasting service 110 analyzes the data on a zone basis. For example, the demand forecasting service 110 may identify all the requests that are dispatched to and fulfilled by a zone 104a during the past 6 weeks. To quantify the historical demand directed to the zone 104a, the demand forecasting service 110 may generate a temporal distribution of cumulated requests on a daily or hourly basis. For example, a temporal distribution of cumulated requests on a daily basis may be a temporally ordered list of 42 scalar numbers each representing a cumulated quantity of requests dispatched to the zone 104a on each given day of the past 6 weeks. The cumulated quantity of requests for each duration can be considered a demand for virtual computing resources for the duration (e.g., a given day within the past 6 weeks). A person of skill in the relevant art will appreciate that the requests can be cumulated on any durational basis and a temporal distribution can be generated therefrom. Further, the temporal distribution can be generated with respect to requests for a particular instance type or a set of instance types (e.g., a family of instance types that can be hosted by computing nodes provisioned with same hardware and/or software).

Additionally, the demand forecasting service 110 may examine the requests or information associated with the dispatch of the requests and distinguish requests that target the zone 104a from untargeted requests. With the identification of targeted and untargeted requests, the temporal distribution can further include a percentage, ratio, or other metrics that quantify targeted or untargeted demand. For example, a percentage of untargeted requests within a total quantity of requests dispatched to the zone 104a for each duration (e.g., hour, day, etc.) can be included in the temporal distribution. As another example, a standalone temporal distribution of cumulated untargeted requests or targeted requests can be generated.

Alternatively, the temporal distribution of cumulated requests may correspond to a temporally ordered list of vectors each representing a demand for a corresponding duration. A demand in a vector form may include elements corresponding to respective demands for particular types of instances, sets of instance types, targeted requests, untargeted requests, combination of the same or the like. The generated temporal distribution of demand, whether associated with scalars or vectors, can be treated as a time series of data points. Accordingly, the demand forecasting service 110 may build a time series based forecasting model based on the temporal distribution. Various time series models can be employed by the demand forecasting service 110, such as autoregressive integrated moving average (ARIMA), Box-Jenkins, or exponential models. In particular, a vector form of demand may allow applicable forecasting models to capture the dependencies, correlations, or other interrelations among elements of the vector. For example, an applicable forecasting model may capture correlations between earlier targeted demand and later untargeted demand with respect to a particular family of instances that are requested. As another example, an applicable forecasting model may determine a dependency between at least a portion of future demand that target a specific zone and historical untargeted demand that were dispatched to the specific zone. Such dependencies, correlations, or other interrelations may contribute to prediction of future demands.

The demand forecasting service 110 may generate demand forecast based on one or more forecasting models. The demand forecast may include predictions of demand for different durations of time in the future, such as predicted quantities of requests for each day of the upcoming week. The demand forecast may be presented using the same quantifying metrics in scalar or vector form as used in corresponding temporal distributions that informed the one or more forecasting models. In some embodiments, a prediction can indicate a numerical range associated with a confidence level. For example, the prediction may indicate that a total quantity of requests to be dispatched to the zone 104a on Monday next week has a 90% chance of falling between an estimated lower limit value and an estimated upper limit value. As a person of skill in the relevant art will appreciate, the demand forecast can be generated with respect to a particular type of instance, a set of instance types, untargeted demand, targeted demand, combinations of the same, or the like.

In another embodiment, the demand forecasting service 110 analyzes historical untargeted demand with respect to a set of zones that may handle the demand (e.g., a geographic region where multiple data centers are distributed across the region). For example, when the untargeted demand accounts for a considerable portion (e.g., more than 20%) of corresponding total demand, one skilled in the relevant art may find it desirable to consider untargeted demand with respect to the set of zones as a whole. As another example, there may not be sufficient data regarding untargeted requests that are dispatched to individual zones to warrant a statistically sound analysis or prediction at the zone level, therefore it may be more desirable to perform such analysis with respect to the set of zones. As described above, requests corresponding to the untargeted demand may be fulfilled by any zone of the set of zones. The demand forecasting service 110 may aggregate untargeted requests that are dispatched to and fulfilled by one or more zones of the set of zones and generate a temporal distribution of the aggregated untargeted requests on any durational basis. The demand forecasting service 110 may then build a forecasting model based on the historical untargeted demand with respect to the set of zones and predict future untargeted demand toward the set of zones. Again, the model building and forecasting can be done with respect to a particular type of instance or set of instance types.

At (6), the demand forecasting service 110 provides the generated demand forecast to the service provider system manager 102. The transmission of the demand forecast can be performed periodically (e.g., weekly or monthly) or upon request by the service provider system manager 102. At (7), the service provider system manager 102 allocates physical computing resources based on the demand forecast. For example, the service provider system manager 102 may increase the free capacity of zone 104a for a family of instance types in accordance with a predicted surge in targeted demand to zone 104a. The service provider manager 102 can achieve this by generating plans for building additional server rooms, adding more racks of servers, or re-provisioning existing computing nodes within zone 104a. Similarly, the service provider system manager 102 may adjust the free capacity of other zones 140b, 140c, etc. that belong to a set of zones corresponding to a geographic region. Thereafter, the service provider system manager 102 may select one or more zones from the set of zones and allocate additional resources to the selected one or more zones for handling untargeted demand as predicted. The selection can be based on a projected free capacity of different zones with respect to different types of instances, cost, and efficiency associated with allocation of same additional resources to the different zones, secondary effects (e.g., likelihood that users may send targeted requests to a zone that has fulfilled earlier untargeted requests), etc. In some embodiments, the service provider system manager 102 may decide that it is more desirable to build one or more new zones within a corresponding geographic region to handle at least a portion of future untargeted demand.

Figure 4:
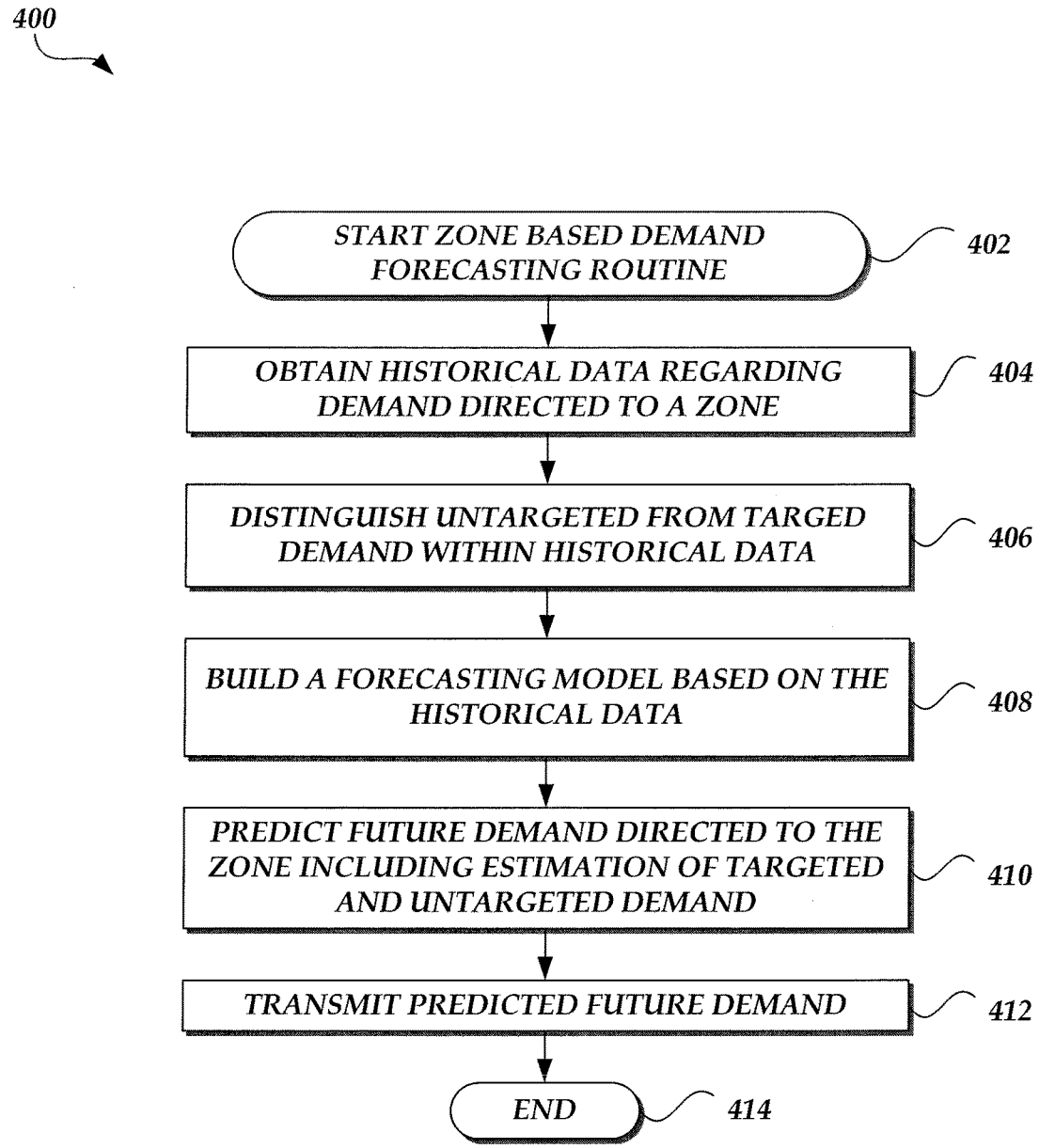
FIG. 4 is a flowchart illustrating an embodiment of an availability zone based demand forecasting routine implemented by the demand forecasting service in accordance with the operating environment of FIG. 1.

FIG. 4 is a flowchart illustrating an embodiment of an availability zone based demand forecasting routine implemented by the demand forecasting service 110 in accordance with the operating environment 100 of FIG. 1. The routine starts at block 402. At block 404, the demand forecasting service 110 obtains historical data regarding demand directed to a zone 104a. In some embodiments, the demand forecasting service 110 retrieves raw log files, which include timed information regarding requests and dispatches that accumulated over a predetermined period of time, from the demand data store 103. In other embodiments, the demand forecasting service 110 may be able to query the demand data store 103 based on attributes associated with the requests or dispatches, such as zones, instance types, targeted or untargeted requests, duration of time, combination of the same, or the like. In still other embodiments, the demand forecasting service 110 may obtain historical data regarding respective demand directed to multiple zones 104a, 104b, 104c, etc., for the purpose of capturing dependencies or correlations among the demand directed to different zones using, for example, an applicable forecasting model that is to be employed.

At block 406, the demand forecasting service 110 distinguishes untargeted demand from targeted demand within the obtained historical data. For example, the demand forecasting service 110 may examine information associated with the requests, such as an API call parameter that indicate whether the request can be fulfilled by any zone of a geographic region or must be fulfilled by the specific zone 104a. As another example, the demand forecasting service 110 may parse applicable metadata associated with the dispatch of the requests and distinguish targeted from untargeted requests.

At block 408, the demand forecasting service 110 builds a forecasting model based on the historical demand data. Illustratively, to quantify the historical demand directed to a zone, the demand forecasting service 110 may generate a temporal distribution of cumulated requests on a daily or weekly basis. For example, a temporal distribution of cumulated requests on a weekly basis may be a temporally ordered list of 52 scalar numbers each representing a cumulated quantity of requests dispatched to the zone during each week of the past year. The cumulated quantity of requests for each duration can be considered a demand for virtual computing resources for the duration (e.g., a given week within the past year). A person of skill in the relevant art will appreciate that the requests can be cumulated on any durational basis and a temporal distribution can be generated therefrom. Further, the temporal distribution can be generated with respect to requests for a particular instance type, set of instance types (e.g., a family of instances types that can be hosted by computing nodes provisioned with same hardware and/or software), targeted or untargeted demand, combination of the same, or the like. Still further, a percentage, ratio, or other metric can be used to quantify a particular type of demand (e.g., untargeted demand for a type of virtual machine instances) as compared to a total magnitude of demand (e.g., a total number of requests for all virtual machine instance types).

Alternatively, the temporal distribution of cumulated requests may correspond to a temporally ordered list of vectors each representing a demand for a corresponding duration. A demand in a vector form may include elements corresponding to respective demands for particular types of instances, sets of instance types, targeted requests, untargeted requests, combination of the same, or the like. The generated temporal distribution of demand, whether associated with scalars or vectors, can be treated as a time series of data points. Accordingly, the demand forecasting service 110 may build a time series based forecasting model based on the temporal distribution of cumulated requests. Various time series models can be employed by the demand forecasting service 110, such as autoregressive integrated moving average (ARIMA), Box-Jenkins, or exponential models.

At block 410, the demand forecasting service 110 predicts future demand directed to the zone 104a, based on one or more forecasting models. The predicted future demand may include both targeted and untargeted demand for different durations of time in the future, such as predicted quantities of requests for each week of the next 3 months. In some embodiments, a prediction can indicate a numerical range associated with a confidence level. For example, the prediction may indicate that a predicted quantity of untargeted requests for a family of instance types has a 95% chance of falling between an estimated lower limit value and an estimated upper limit value. As a person of skill in the relevant art will appreciate, the demand forecast can be generated with respect to a particular type of instance, a set of instance types, untargeted demand, targeted demand, combinations of the same, or the like.

At block 412, the demand forecast service 110 transmits the predicted future demand to the service provider system manager 102, other components, or a system administrator of the service provider computer network 101. As described above, the predicted future demand may include estimations of both targeted and untargeted demand for different durations of time in the future. The predicted future demand can be used to allocate physical computing resources to the zone 104a, or among multiple zones. For example, if a spike in the demand directed to the zone 104a is predicted to occur at a future time, the service provider system manager 102 or a system administrator may determine whether the spike mostly comprises future targeted or untargeted demand. If the predicted spike is mostly targeted demand, physical computing resources can be directly allocated to the zone 104a to address the spike. On the other hand, if the predicted spike is mostly untargeted demand, the service provider system manager 102 or a system administrator may decide to direct at least some portion of the future untargeted demand toward other zones to be adequately handled. For example, the service provider system manager 102 may modify a load balancing algorithm so that requests corresponding to 50% of the predicted future untargeted demand will be dispatched to a lessor used zone. The routine of FIG. 4 ends at block 414.

Figure 5:
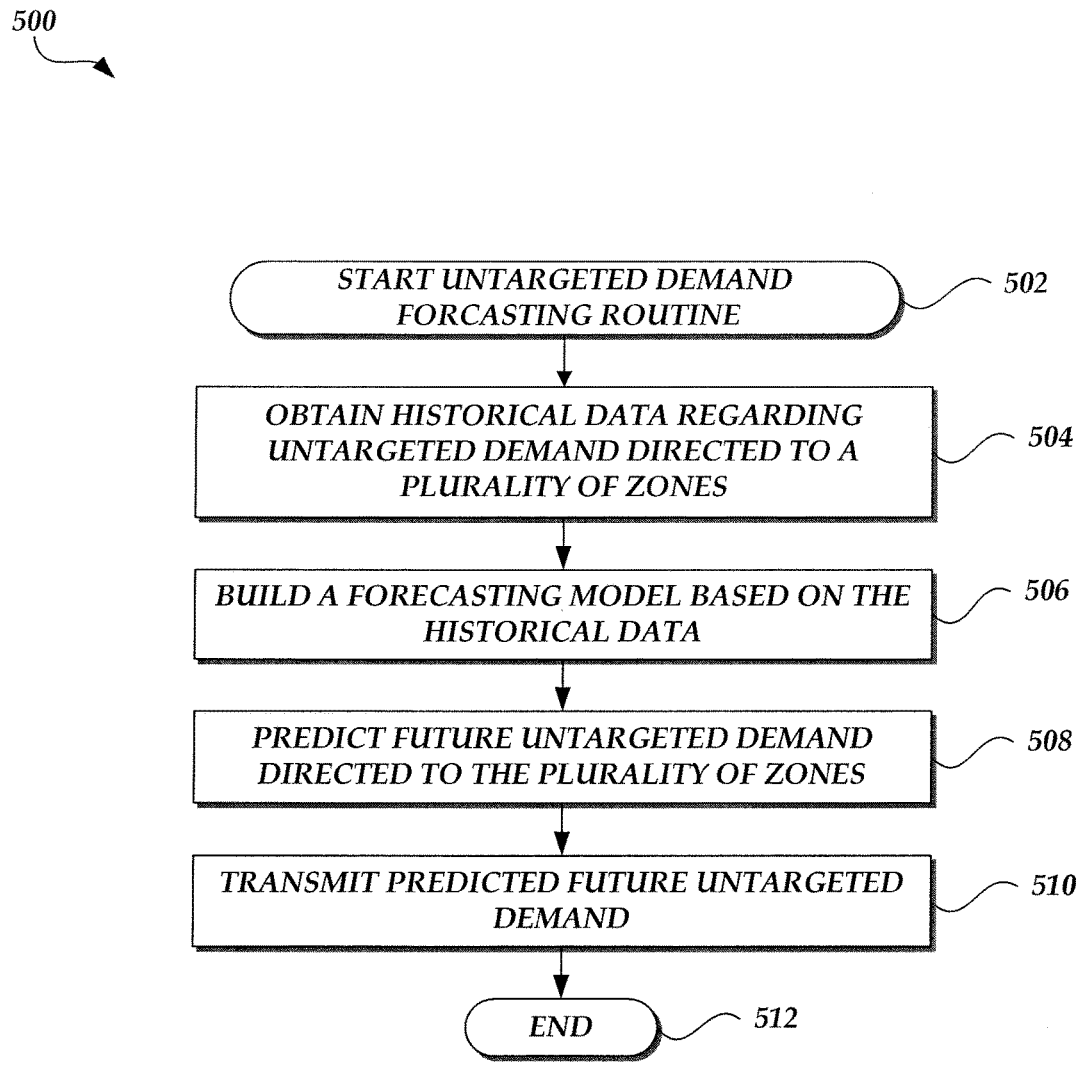
FIG. 5 is a flowchart illustrating an embodiment of an untargeted demand forecasting routine implemented by the demand forecasting service in accordance with the operating environment of FIG. 1.

FIG. 5 is a flowchart illustrating an embodiment of an untargeted demand forecasting routine implemented by the demand forecasting service 110 in accordance with the operating environment 100 of FIG. 1. The routine starts at block 502. At block 504, the demand forecasting service 110 obtains historical data regarding untargeted demand directed to a set of zones, such as zones 104a, 104b and 104c. For example, the demand forecasting service 110 may be able to query the demand data store 103 to retrieve all the untargeted requests that were dispatched to and/or fulfilled by the zones 104a, 104b, and 104c during a specified period of time in the past.

At block 506, the demand forecasting service 110 builds a forecasting model based on the historical demand data. As described above, the untargeted requests may have been fulfilled by any zone of the set of zones (e.g., an untargeted request dispatched to and fulfilled by zone 104a could have been fulfilled by zone 104b). Therefore, the demand forecasting service 110 may add up quantities of untargeted requests that were dispatched to each zone of the set of zones into an aggregate quantity directed to the set of zones as a whole. For example, on day X, 3000 untargeted requests were dispatched to zone 104a, 5000 to zone 104b, and 1000 to zone 104c, then an aggregate quantity of untargeted requests directed to the set of zones is 9000 for day X. The demand forecasting service 110 may generate a temporal distribution of the aggregated untargeted requests on any durational basis. Further, the temporal distribution can be generated with respect to untargeted requests for a particular instance type or set of instance types (e.g., a family of instances types that can be hosted by computing nodes provisioned with same hardware and/or software). Still further, a percentage, ratio, or other metric can be used to quantify a particular type of untargeted demand as compared to a total magnitude of untargeted demand. Alternatively, the temporal distribution of aggregated untargeted requests may correspond to a temporally ordered list of vectors, each vector including elements corresponding to respective untargeted demands for particular types of instances or sets of instance types.

The generated temporal distribution of untargeted demand directed to the set of zones, whether associated with scalars or vectors, can be treated as a time series of data points. Accordingly, the demand forecasting service 110 may build a time series based forecasting model based on the temporal distribution of cumulated requests. Various time series models can be employed by the demand forecasting service 110, such as autoregressive integrated moving average (ARIMA), Box-Jenkins, or exponential models.

At block 508, the demand forecasting service 110 predicts future untargeted demand directed to the set of zones, based on one or more forecasting models. The predicted future untargeted demand may include predicted demand for different types or families of instances, and for different durations of time in the future. In some embodiments, a prediction can indicate multiple numerical ranges each associated with a respective confidence level. For example, the prediction may indicate that a quantity of future untargeted requests for a family of instance types has a 95% chance of falling between a first estimated lower limit and a first estimated upper limit, has an 80% chance of falling between a second estimated lower limit and a second estimated upper limit, and has a 50% change of falling between a third estimated lower limit and a third estimated upper limit.

At block 510, the demand forecast service 110 transmits the predicted future untargeted demand to the service provider system manager 102, other components, or a system administrator of the service provider computer network 101. The predicted future untargeted demand can be used for allocation of computing resources among the set of zones. For example, the service provider system manager 102 or a system administrator may determine a total magnitude of computing resources to allocate to the set of zones as a whole, in order to meet the predicted untargeted demand. Subsequently, allocation of the total magnitude of resources to individual zones of the set of zones can be determined based on various factors. Illustratively, a proportional-integral-derivative (PID) controller may be employed to direct future untargeted demand to individual zones in accordance with a distribution, which can also direct the specific allocation of computing resources toward the individual zones so that the system is self-balanced. As another example, the service provider system manager 102 may use the predicted future untargeted demand to modify a corresponding load balancing algorithm or system, and distribute future untargeted demand to individual zones so as not to overload any of the zones at a future time. The routine of FIG. 5 ends at block 512.

Depending on the embodiment, certain acts, events, or functions of any of the methods described herein can be performed in a different sequence, can be added, merged, or left out altogether (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules and method elements described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The elements of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM or any other form of computer-readable storage medium known in the art. A storage medium can be coupled to the processor such that the processor can read information from, and write information to, the storage medium. In the alternative, the storage medium can be integral to the processor.

The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g." and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," "involving" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A computer-implemented method for managing virtual machine instances, the computer-implemented method comprising:
under control of a computing device configured with specific computer executable instructions,
obtaining historical demand data related to instantiating a plurality of virtual machine instances during a specified period of time, wherein the historical demand data is based, at least in part, on:
a plurality of instantiation requests submitted by one or more clients of a plurality of clients for instantiating virtual machine instances; and
identification of one or more availability zones of a plurality of geographically distinct availability zones associated with a computing service provider, the one or more availability zones fulfilling the plurality of instantiation requests submitted by the one or more clients;
analyzing the historical demand data to identify untargeted demand corresponding to a first subset of the plurality of instantiation requests for launching virtual machine instances from any unspecified availability zone of the plurality of availability zones;
analyzing the historical demand data to identify targeted demand corresponding to a second subset of the plurality of instantiation requests for launching virtual machine instances from a specified availability zone of the plurality of geographically distinct availability zones as specified by individual requests of the second subset;
building a forecasting model based on the identified targeted and untargeted demand;
generating a predicted future demand based, at least in part, on the forecasting model, wherein the predicted future demand can be used to allocate computing resources among the plurality of availability zones.

2. The computer-implemented method of claim 1, wherein the predicted future demand includes information regarding future targeted demand and future untargeted demand.

3. The computer-implemented method of claim 1, wherein the first subset of the plurality of instantiation requests are fulfilled by one or more availability zones of the plurality of availability zones based, at least in part, on a free capacity associated with the one or more availability zones.

4. The computer-implemented method of claim 3, wherein the free capacity associated with the one or more availability zones varies based, at least in part, on the allocation of computing resources.

5. The computer-implemented method of claim 1, wherein each of the plurality of geographically distinct availability zones corresponds to a distinct city of a plurality cities.

6. A non-transitory computer readable storage medium storing computer executable instructions that when executed by a processor perform operations comprising:
obtaining data regarding historical demand for virtual machine instances;
identifying untargeted demand based, at least in part, on an analysis of the obtained data, wherein the untargeted demand corresponds to a portion of the historical demand for launching virtual machine instances within any unspecified availability zone of a plurality of geographically distinct availability zones associated with a computing service provider;
predicting at least one attribute of future untargeted demand based, at least in part, on the analysis of the obtained data, wherein the predicted at least one attribute of future untargeted demand can be used to allocate computing resources among the plurality of availability zones.

7. The non-transitory computer readable storage medium of claim 6, wherein the historical demand corresponds to a quantity of requests for instantiation of virtual machine instances.

8. The non-transitory computer readable storage medium of claim 6, wherein the at least one attribute of the future untargeted demand corresponds to a measure of the future untargeted demand that may be handled by a specific availability zone of the plurality of availability zones.

9. The non-transitory computer readable storage medium of claim 6, wherein the at least one attribute of the future untargeted demand corresponds to a measure of the future untargeted demand that may be handled by all availability zones of the plurality of availability zones.

10. The non-transitory computer readable storage medium of claim 6, wherein the at least one attribute of the future untargeted demand corresponds to a ratio between the future untargeted demand to future total demand that may be handled by the one or more zones of the plurality of availability zones.

11. The non-transitory computer readable storage medium of claim 6, wherein the operations further comprise identifying targeted demand based, at least in part, on the analysis of the obtained data, wherein the targeted demand corresponds to a second portion of the historical demand for launching virtual machine instances within a specified availability zone of the plurality of availability zones.

12. The non-transitory computer readable storage medium of claim 11, wherein the operations further comprise predicting at least one attribute of future targeted demand directed to the specified availability zone.

13. A system comprising:
a data store configured to at least store computer-executable instructions; and
a hardware processor in communication with the data store, the hardware processor configured to execute the computer-executable instructions to at least:
obtain data regarding historical demand for virtual machine instances;
identify untargeted demand based, at least in part, on an analysis of the obtained data, wherein the untargeted demand corresponds to a portion of the historical demand for launching virtual machine instances within any unspecified availability zone of a plurality of geographically distinct availability zones associated with a computing service provider;
predict at least one attribute of future untargeted demand that may be handled by one or more availability zones of the plurality of availability zones based, at least in part, on the analysis of the obtained data, wherein the predicted at least one attribute of future untargeted demand can be used to allocate computing resources among the plurality of availability zones.

14. The system of claim 13, wherein the historical demand for virtual machine instances comprises historical demand for launching a plurality of types of virtual machine instances.

15. The system of claim 14, wherein at least one of the identification of the untargeted demand, prediction of the at least one attribute of the future untargeted demand, or the allocation of computing resources is based, at least in part, on the plurality of types of virtual machine instances.

16. The system of claim 13, the processor is further configured to at least identify the untargeted demand based, at least in part, on requests transmitted to the computing service provider for launching virtual machine instances.

17. The system of claim 13, the processor is further configured to at least cause allocation of computing resources toward a second plurality of availability zones based, at least in part, on the predicted at least one attribute of the future untargeted demand.

18. The system of claim 13, wherein the future untargeted demand will be handled by the one or more availability zones based, at least in part, on the allocation of computing resources.

19. The system of claim 13, wherein the historical demand further comprises targeted demand for launching virtual machine instances from specified one or more availability zones of the plurality of availability zones.

20. The system of claim 19, wherein the hardware processor is further configured to at least predict the at least one attribute of the future untargeted demand based, at least in part, on the targeted demand.

21. The system of claim 13, wherein the hardware processor is further configured to at least predict at least one attribute of future targeted demand for launching virtual machine instances from specified one or more availability zones of the plurality of availability zones based, at least in part, on the identified untargeted demand.

22. The system of claim 13, wherein the hardware processor is further configured to automatically predict the at least one attribute of the future untargeted demand.

* * * * *